United States Patent Office

3,527,246
Patented Sept. 8, 1970

3,527,246
CUT-OFF VALVE FOR A HEATING OIL SUPPLY INSTALLATION
Jorgen Hartvig Petersen, Nordborg, and Leif Viggo Sturlason, Sonderborg, Denmark, assignors to Danfoss A/S, Nordborg, Denmark, a company of Denmark
Filed Dec. 5, 1967, Ser. No. 688,045
Int. Cl. F16k *31/12*
U.S. Cl. 137—512.2                1 Claim

ABSTRACT OF THE DISCLOSURE

The invention relates to a cut-off valve of the type utilized between the pump and nozzle of a heating system oil burner unit.

Figure 1:
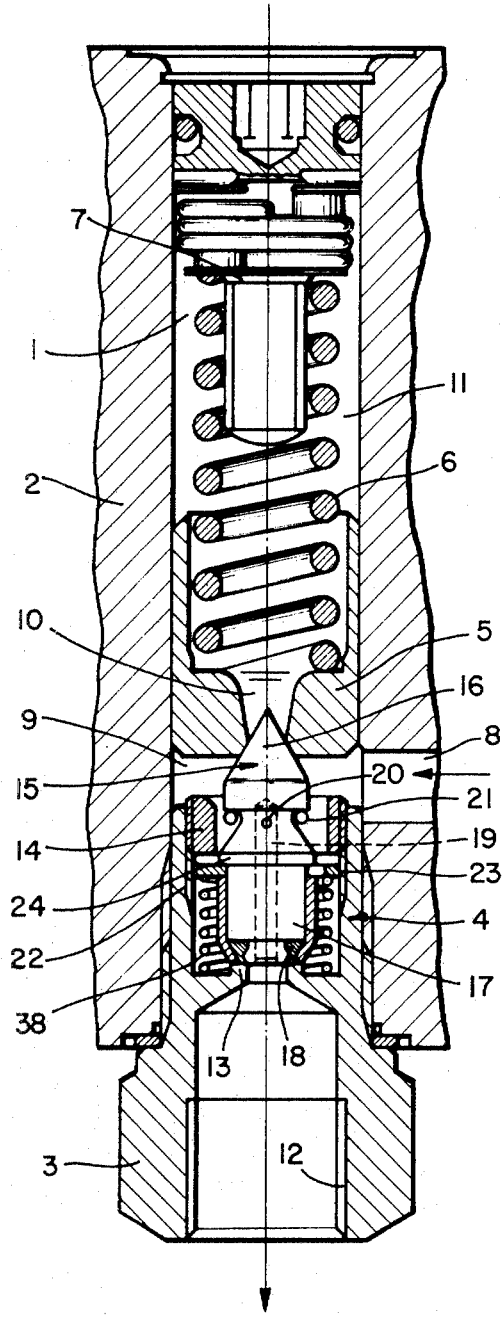

The end face of the cut-off valve is provided, in prior art devices, with a sealing washer made of a resilient material such as rubber. High pumping pressures have a tendency to disengage a sealing washer from the valve surface to which it is attached and various prior art constructions have been devised in attempts to securely attach the sealing washer to the valve face.

In this invention a construction is provided for attaching a sealing washer to the end of a cut-off valve in a manner which minimizes the chances of the sealing washer becoming detached or dislodged by high oil pressures to which it is subjected. This construction involves the providing of a cut-off valve having a specially formed annularly shaped recess at one end thereof in which there is disposed a specially formed annularly shaped sealing washer.

---

The present invention relates to a cut-off valve between the pump and nozzle of a heating oil supply installation, wherein a sealing ring is held against the end-face of a valve element in a recess which is preferably bounded by two components and the bore of which diminishes towards the end-face. The cut-off valve is particularly suitable for heavy and very heavy oil.

It is known to fit an O-ring as a sealing ring in a recess having a rectangular radial cross-section. Here, during the standstill period, a pressure corresponding to the pump pressure develops in the unoccupied space between the ring and the recess, which pressure drives the sealing ring out of the recess when the valve is opened a little since a considerably lower pressure obtains between the sealing ring and the valve seating. To overcome this trouble, the inner wall of the recess has been flangd over the ring or an inner sleeve with a bent-over edge has been inserted in the valve element. This step, however, has not sufficed to take into account the pressure differences occurring in a heating oil supply installation, particularly when heavy oil is burned; with this construction, too, the rings were pressed out of the recess. In a further development, an attempt was made to clear the oil under pressure more rapidly from the spaces between the sealing ring and the recess by means of exhaust passages. This exhausting did indeed contribute somewhat to effecting relief, so that this construction could be used in installations involving pressures of up to about 20 atmos. In heating oil installations, however, it is necessary to cater for considerably higher pressures of up to 35 atmos., for instance. Furthermore, in many installations, particularly if a magnetic cut-off valve is provided in the nozzle piping, the exhaust passages have the disadvantages that the oil under pressure can easily penetrate therethrough into the spaces between the sealing ring and the recess.

A further proposal simply resorted to bonding a sealing washer on the end-face of the valve element. It is, however, as good as impossible to effect so intimate a bond that no oil penetrates behind the sealing washer at the high pressures obtaining. This oil, under high pressure, that has forced its way in, then tears off the bonded sealing washer when the valve is opened.

The object of the present invention is to provide a cut-off valve of the initially described kind in which it is ensured that the sealing ring remains in place even with very high pressures in the heating oil supply installation, without difficulties in manufacture thereby arising.

The invention is characterized in that the radial cross-sections of the recess and of the part of the sealing ring held therein are substantially the same.

This step results in the sealing ring clamped in the recess lying closely against and around the walls of the recess, so that no, or no appreciable, spaces are present into which oil under high pressure could penetrate. Consequently, the ring cannot be forced out of the recess when the valve is opened. In contrast with a sealing washer having the same outside diameter, such a ring is held considerably more firmly in the recess, since, because of its small cross-sectional area it is less resilient and is supported on a peripheral area which is greater in terms of a percentage. Furthermore, the radial clamping force of the sealing ring is utilized for effecting a hold. Additionally, in this arrangement it is possible to dispense with the exhaust bore which is relatively time-consuming and fairly expensive to provide.

It is particularly advantageous if the cross-section is largely bounded by straight lines. In the first place, such a cross-section can be readily produced. Secondly, it is as good as impossible for cavities to form between the adjacent surfaces of the sealing ring and the recess. Thirdly, a throttle gap of considerable length occurs between the rectilinear limits, so that the entry of oil into any smaller cavities that may possibly be present is rendered very difficulty.

In a preferred embodiment, the cross-section has roughly the shape of a symmetrical trapezium. The lateral surfaces of the trapezium, that run towards each other, in conjunction with the full bearing contact with the sealing ring, results in the latter being held extremely firmly in the recess. When the part of the sealing ring projecting outwardly through the valve seating comes under load, the ring bears closely against the two lateral surfaces of the trapezium, so that the entry of oil is rendered still more difficult.

When designing the groove, it is of advantage if the side of the cross-section remote from the end-face joins the adjacent side of the cross-section at an angle and that the two components which bound the recess meet at the apex of the angle. The angular form of the recess and of the ring at the point at which the two components join results, on the one hand, in ease of manufacture and, on the other, in a very small cavity or no cavity at all.

Manufacture is further simplified by forming the recess by an annular groove, running from the periphery and end-face of the valve element and limited at the inside by a cone widening out in the direction of the end-face, and by the inwardly curved edge of a sleeve fitted over the periphery of the valve element. These components are easy to manufacture and to join together. The sealing ring is stretched and then fitted over the surface of the cone. It is thereby self-centering and also bears against the surface of the base of the recess. If the ring is fitted under pre-tension, this ensures that it bears tightly against the cone and the surface of the base of the recess, so that when the sleeve is fitted on it is only necessary to take care that the edge of the sleeve lies close against the sealing ring.

Furthermore, the end of the sleeve remote from the end-face can hold a valve-spring seating ring against a flange on the valve element. The sleeve thus performs a second function. It only needs to be pressed on to the periphery of the valve element. For this, only slight surface pressure is required on account of the large bearing surface.

Figure 2:
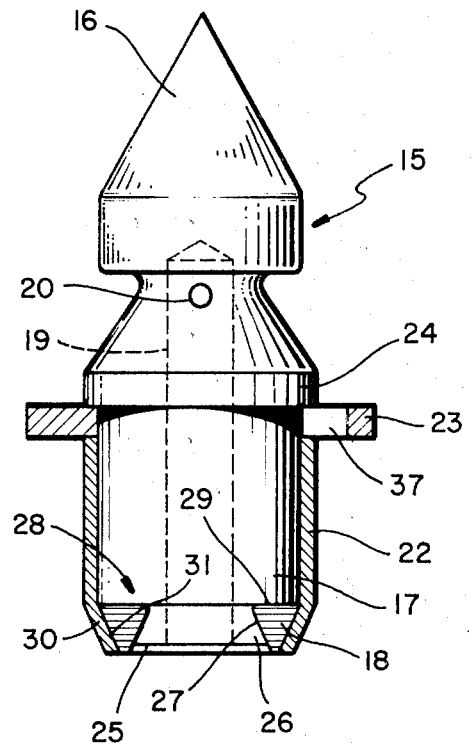
Figure 3:
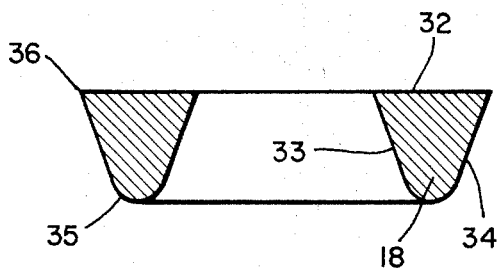

The invention will now be described in more detail by reference to an embodiment illustrated in the drawing, wherein:

FIG. 1 shows a fragmentary section through the control valve system of a heating oil supply installation, FIG. 2 is an illustration, on an enlarged scale and partly in section, of the movable part of the cut-off valve according to the invention, and FIG. 3 shows a radial section, on an enlarged scale, through a sealing ring used in accordance with the invention.

Screwed from below into a bore 1 of a valve housing 2 is a port 3 which incorporates a cut-off valve 4 according to the invention and to be described later. Fitted in the bore is a slide 5 which is depressed by means of a spring 6. The spring bears against displaceable means which will not be described. Through a passage 8, the pump supplies oil under pressure to the space 9 below the slide 5. As a result of this, the slide lifts until its opening 10 is uncovered. Excess oil is discharged from the bore cavity 11 to the suction side of the pump. A bore, not illustrated, is controlled by the slide 5 in such manner that an approximately constant pressure is maintained in the cavity 9 during operation.

The thread 12 at the unoccupied outer end of the port 3 serves for connecting the nozzle piping. The port also provides a seating 13 for the cut-off valve and, in a further threaded part, accommodates a retaining nut 14 which limits the axial play of the valve element 15. This valve element performs several functions. Firstly, its tip 16 acts as a closure member for the pressure-regulating slide 5. Secondly, at its lower part 17 it carries a sealing ring 18 which cooperates with the cut-off valve seating 13. Thirdly, extending from its lower end-face, it has a bore 19, closed at one end, with transverse bores 20, kept closed by an O-ring 21. This arrangement serves as a check valve when the pressure below the cut-off valve becomes greater than the pressure in the cavity 9. Fourthly, the portion 17 of this valve element, with the help of a sleeve 22, holds a seat washer 23 against a flange 24 on the valve element 15. A return spring 38 for the cut-off valve bears against the seat washer.

The mode of operation of such a valve system is known.

FIG. 2 shows more accurately the construction of the moving part of the cut-off valve according to the invention. Provided at the lower end-face 25 of the valve element 15 is a cone which widens towards the end-face and the conical surface 27 of which forms a wall of the recess 28 for accommodating the sealing ring 18. A second wall of the recess 28 is formed by an annular surface 29 which is provided when turning the cylindrical part 17 for the purpose of producing the cone 26. The sleeve 22 has at its lower end an inwardly curved or flanged edge 30 which forms a third boundary surface 31 of the recess 28. In this way a recess having a roughly trapezoidal radial cross-section is obtained, the two sides 27 and 31 being disposed roughly symmetrically and defining an angle of 48°.

The sealing ring 18 (FIG. 3) has a substantially similar radial cross-section in the form of a trapezium, the surface 32 on the base of which matches the surface 29 on the base of the recess, its inner side wall 33 matching the lateral surface 27 of the recess, and its other lateral surface 34 matching the other lateral surface 31 of the recess. Only at its rounded lower end 35 does the sealing ring 18 project beyond the recess and bear upon the valve seating 13. The edge 36 of the sealing ring extends to the point at which the valve element 15 and the sleeve 22 meet. The edge can be well matched to this junction.

It can be seen that with this arrangement there is practically no possibility at all of a cavity forming between the sealing ring and the recess and that a pressing out of the ring from the recess is excluded on account of the lateral walls 27 and 31 of the recess overlapping on both sides.

The sleeve 22 is pushed on to the cylindrical portion 17 of the valve element 15 and is a press-fit thereon, and at the same time holds the seating ring 23 against the flange 24. The ring 23 contains orifices 37 for the passage therethrough of oil.

When assembling, the ring 18 is stretched somewhat and drawn over the cone 26, thereby centering itself. All that is then required is for the ring 23 and the sleeve 22 to be placed in position.

We claim:

1. A cut-off valve of the type utilized between the pump and nozzle of a heating system oil burner unit, comprising, a cylindrically shaped portion, a frustoconically shaped portion integral with said cylindrically shaped portion and having a major and minor diameter, said minor diameter being adjacent one end of said cylindrically shaped portion and said major diameter being smaller than the diameter of said cylindrically shaped portion, a sleeve member surrounding said cylindrically shaped portion and having a converging frustoconically shaped skirt in surrounding relation to said first referred to frustoconically shaped portion to form an annular trapezoidally shaped enclosure, a resilient sealing member disposed in said enclosure, a bore extending axially through said portions, a laterally extending bore intersecting said axially extending bore, and a sealing ring cooperating with said laterally extending bore to form a check valve.

References Cited

UNITED STATES PATENTS

| 2,290,177 | 7/1942 | Grant | 251—333 |
| 2,414,908 | 1/1947 | Smith | 251—333 |
| 2,457,492 | 12/1948 | Raybould | 251—357 XR |
| 2,820,474 | 1/1958 | Greenwood | 251—333 XR |
| 2,962,039 | 11/1960 | Shand | 251—333 XR |

FOREIGN PATENTS 674,110   6/1952   Great Britain.

WILLIAM F. O'DEA, Primary Examiner

W. H. WRIGHT, Assistant Examiner

U.S. Cl. X.R.

137—516.15; 251—333, 360